May 12, 1959 W. KALIN ET AL 2,886,809

MULTISERVICE TYPE TELEPHONE RINGER

Filed Feb. 19, 1954 2 Sheets-Sheet 1

INVENTORS W. KALIN
G. G. LAVERY
BY A. F. Kane
ATTORNEY

MULTISERVICE TYPE TELEPHONE RINGER

Filed Feb. 19, 1954 2 Sheets-Sheet 2

CURRENT WAVE IN BRANCH "A"

CURRENT WAVES IN BRANCHES "B" & "C"

INVENTORS W. KALIN
G. G. LAVERY
BY
G. F. Kane
ATTORNEY

United States Patent Office 2,886,809

Patented May 12, 1959

2,886,809

MULTISERVICE TYPE TELEPHONE RINGER

Walter Kalin, Morristown, and Grant G. Lavery, Summit, N.J., assignors to Bell Telephone Laboratories, Incorporated, New York, N.Y., a corporation of New York Application February 19, 1954, Serial No. 411,397

3 Claims. (Cl. 340—401)

This invention relates to signaling devices and particularly to telephone ringers.

With the tremendous expansion of the telephone plant in the past few decades the need for standardization of apparatus and the elemination of all unnecessary codings of apparatus became an urgent economic necessity. Because of its extensive use in the telephone plant under many diverse operating conditions, which heretofore necessitated numerous differently coded variants, the telephone ringer presents a field in which the successful application of the principle of strict standardization would effect large economies.

It is an object of this invention, therefore, to provide a single ringer design which meets the requirements for all major classes of service now provided for in the telephone plant, and thereby to effect economies in the manufacture and merchandising of telephone ringers.

A more particular object of the invention is to provide a single ringer design which meets all the ringing requirements imposed by private line, two-party, four-party selective and eight-party semiselective ringing services.

These objects are attained by combining certain components available in the present type private line, combined telephone set in such a manner as to effect a ringing circuit suitable for multiparty line service.

The commonly used private line telephone set of the combined type includes a capacitor and a single ringer coil comprising two separate windings, an inner low impedance winding and an outer winding of considerably higher impedance. In private party service the two coil windings are connected series aiding and act as a single winding. In accordance with a particular feature of this invention, the ringer is connected as an autotransformer. Specifically, the low impedance ringer winding is connected in series with a capacitor and the resulting series circuit is bridged across the high impedance winding. The resonant circuit thus constituted is connected in series with the main gap of a three-element cold cathode tube to render the ringer operable for multiparty line service.

In accordance with another feature of the invention, which eliminates those restrictions heretofore imposed by the use of unidirectional pulsating current in the operation of party line ringers, the unidirectional pulsating character of the ringing current source is transformed in the ringer windings in such a manner that the forces generated during a ringing interval have a substantially symmetrical full wave characteristic.

These and other features of the invention will be readily understood from the following detailed description when read with reference to the accompanying drawings, in which.

The problem of designing a single telephone ringer which would meet all the precise requirements encountered in party line ringing services presented many difficulties. At the outset and as initial step in the solution of this problem, an attempt was made to use the well-known private line ringer in multiparty services. Because of the limitations present, this application was found to be impracticable. For example, the sensitivity of this ringer, adjusted at the shop to meet the requirements of private line service, was insufficient to guarantee operation in all multiparty services. In addition, the private line ringer impedance was considerably higher than that required for the efficient use of the power available in four-party telephone service.

Perhaps the most serious limitation of the private line ringer was one of fundamental design. The private line ringer was designed to operate on a symmetrical full wave current, and functioned poorly and occasionally became nonoperative when used with the unidirectional pulsating current employed in multiparty telephone service.

Figure 3:
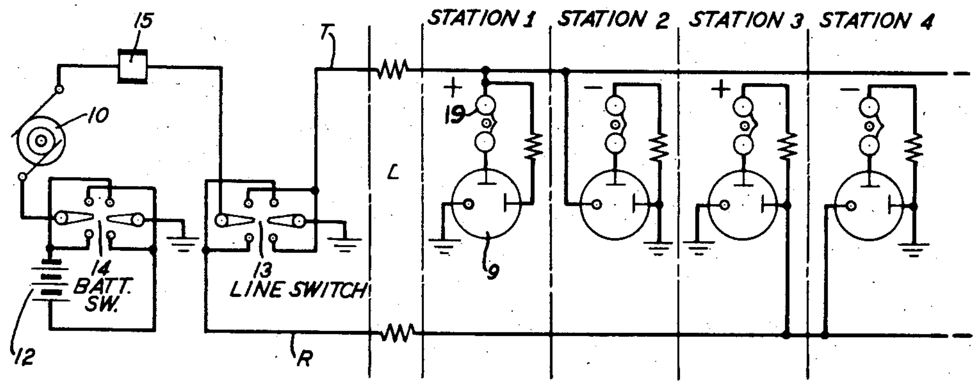
Fig. 3 is a circuit diagram of a four-party selective ringing circuit in common use today.

The four-party selective ringing circuit in common use in the telephone plant is shown in Fig. 3. The activating voltage used in selective ringing consists of a 20-cycle alternating voltage, source 10, on which a direct-current biasing voltage, battery 12, has been superimposed. In four-party ringing, two parties are connected between each side of the telephone line and ground, and signaling is accomplished by impressing these combined voltages across one side of the line and ground. The direction of the direct-current bias on the impressed voltage determines which of the ringers connected to that side of the line will operate. Selection is obtained by connecting a cold cathode tube 9 and the ringer coil in each of the telephone sets, so that one ringer is activated by a negatively biased signaling voltage and the other by a positively biased signaling voltage.

To illustrate, assume that in Fig. 3 the plus (+) party, station 1, on the tip side of the line is being signaled. For purposes of simplification, the operator's line key and ringing key located at a central office are shown as simple double pole, double throw switches, the switch 13 being designated "line switch" and the switch 14 being designated "battery switch." The operator closes the line switch 13 to its upper position thus connecting the ringing current generator 10 to the tip side T of the line L. The switch 13 also grounds the ring side of the line to insure against the false operation of the party telephones on the ring side of the line. Simultaneously, the battery switch 14 is closed in the up or positive direction, thereby impressing the positively biased 20-cycle voltage across the ringer circuits on the tip side of the line. This impressed voltage, because of the direct-current bias, alternates between a rather large positive value and a relatively small negative value. The cold cathode tube 9 in the plus (+) party telephone set on the tip side, being connected to pass those positive voltages that exceed the breakdown voltage of the tube, allows a considerable portion of each cyclic positive pulse to pass through the ringer 19 to ground. These pulses activate the ringer at the called station.

When this same voltage is impressed across the ringer circuit of the non-called party at station 2 on the tip side of the line, the ringer thereat does not respond since the cold cathode tube thereat is so connected as not to pass the positive voltages, and the magnitude of the voltage during the negative portion of the cycle is low. Even should this voltage exceed the breakdown voltage of the tube at station 2, it is insufficient to activate the ringer. Since little or no current flows under these circumstances, the ringer at station 2 will not operate and needlessly disturb the non-called party. Operating the battery switch 14 to its opposite position would result in the operation of the ringer at station 2. Similarly, stations 3 and 4 on the ring side of the line L may be selectively signaled by operating the line switch 13 to its lower position and closing the battery switch 14 to either its upper or lower position depending upon whether station 3 or station 4 is to be signaled. Thus, four subscribers can enjoy telephone service through the cooperative use of a single line and any one of them can be summoned to the telephone without disturbing the other three.

As described above, the current flow through the ringer in four-party service is unidirectional and pulsating. Therefore, each ringer must be properly poled on installation so that it will be activated by the signaling current intended for it. When thus poled, the initial ringing pulse causes the ringer armature to operate so as to allow the clapper ball to strike the furthest gong, as is well known. During the time interval between pulses, the ringer armature must restore to the non-operate position, allow the clapper ball to strike the other gong, and be available for reactivation by the next surge of current. It is necessary, therefore, that the ringer be adjusted with a sufficiently high mechanical restoring force to assure that the armature returns to its original position between ringing pulses.

Should the armature stick magnetically in the operate position, the ringer would be incapable of responding to succeeding signaling impulses. The subscriber's telephone would then be out of service to all incoming calls and could only be restored to service through a visit of a telephone repair man.

The best ringing tone is realized when the mechanical restoring force is held to a minimum. The private party ringer, therefore, is purposely adjusted to have a minimum restoring force so that there is a real danger that a ringer so adjusted would stick and become inoperative if used in multiparty service.

Figure 1:
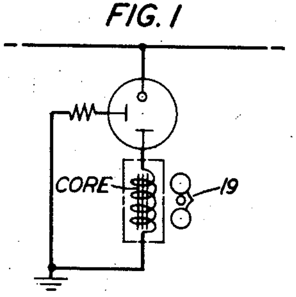
Fig. 1 is a circuit diagram illustrating those elements, and their circuit connections which characterize a party line ringing circuit of the prior art.
Figure 2:
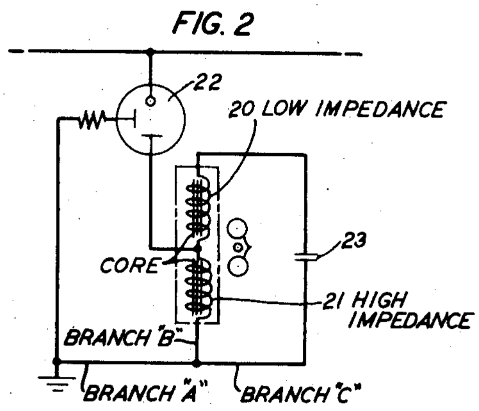
Fig. 2 is a circuit diagram of a party line ringing circuit illustrative of the present invention.

The ringer circuit of this invention overcomes the major difficulties of operating a ringer, designed for individual party service, on multiparty selective service. This circuit is shown in Fig. 2.

As hereinbefore indicated, the single coil of the private party ringer is composed of two separate windings; an inner low impedance winding and an outer winding of considerably higher impedance. In private party service the two windings are connected series aiding and act as a single winding. In two-party message rate service the low impedance winding is connected in all tip party installations as a one thousand-ohm bridge between the tip side of the line and ground for purposes of tip party identification. This bridge is not present in ring party installations so that identifications can be established between parties on the basis of line impedance to ground.

In the circuit of this invention, the double winding is used to advantage by connecting the ringer as an autotransformer. The low impedance winding 20, Fig. 2, in series with the 0.4 mf. condenser 23 is bridged across the high impedance winding 21. This constitutes a resonant circuit which resonates at the frequency of the alternating-current component of the ringing source, and is connected in series with the main cathode of the three-element cold cathode tube 22. Because of these circuit connections, the ringer impedance is considerably reduced resulting in an increased signaling efficiency because of the increase in power that is available to the ringer.

Figure 4:
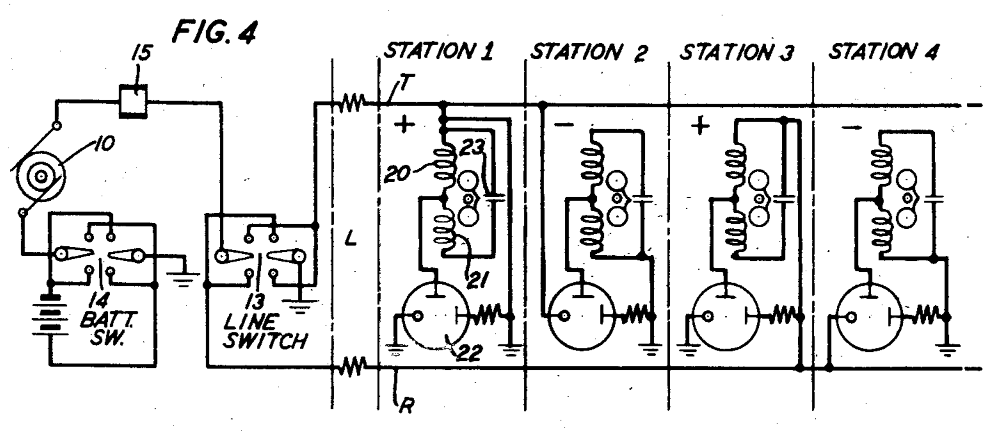
Fig. 4 is a circuit diagram similar to that shown in Fig. 3 except that it embodies the ringing circuit of the present invention.

In addition, the unidirectional pulsating activating current previously normal to four-party service is converted to an approximately symmetrical full wave current within the ringer windings through the use of the resonant circuit connection. Thus, the private party ringer designed to operate on full wave current is rendered suitable for use in multiparty service. Sticking of the armature ceases to be a problem since the reverse half cycle of the activating current is now available to drive the armature back to its normal position. Furthermore, there is a marked improvement in the character of the ringing tone due to the full wave operation. A four-party line embodying the ringer of this invention is shown in Fig. 4.

Figure 5:
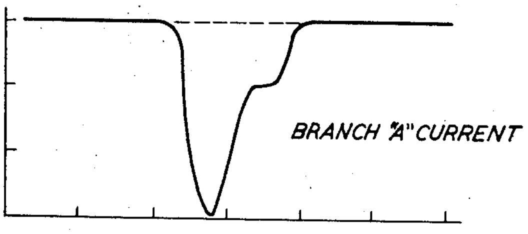
Fig. 5 is a characteristic current curve depicting the shape of the wave of the pulsating current flowing in the main branch of the ringer circuit designated "A" on the circuit diagram of Fig. 2.
Figure 6:
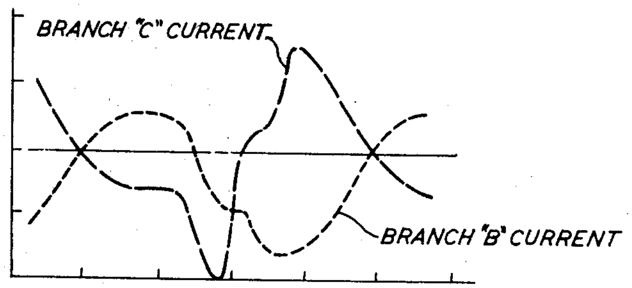
Fig. 6 illustrates characteristic current curves which show the full wave character of the currents flowing in the branches of the ringer circuit designated "B" and "C" in the ringer circuit of Fig. 2.

Fig. 5 shows the wave form of the pulsating current in the main branch A of the ringer circuit shown in Fig. 2. This is the characteristic current curve that, heretofore, made it necessary to design special ringers to insure proper operation in four-party selective service. In contrast, the curves shown in Fig. 6 illustrate the full wave characteristic of the currents flowing in branches B and C of the resonant branch circuit of the ringer.

Figure 7:
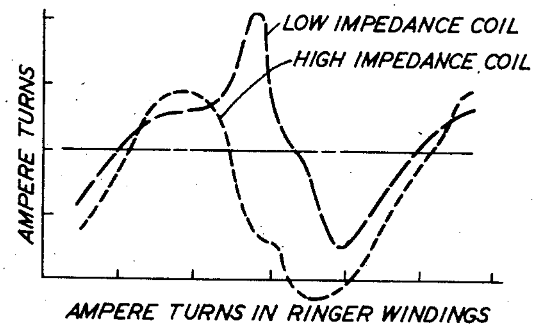
Figs. 7 and 8 are ringer performance curves which show respectively, the ampere turns in each of the windings of the ringer of this invention and the total ampere turns in the ringer coil.
Figure 8:
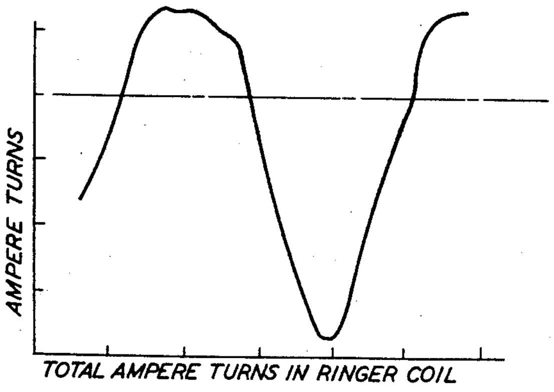

The curves shown in Figs. 7 and 8 show clearly how ringer performance is improved as a result of the ringer circuit of this invention. The curve, Fig. 7, marked "high impedance coil" represents the current curve of branch B, Fig. 6, multiplied by the number of turns in the ringer winding through which that current is passed. The curve marked "low impedance coil" represents the current curve of branch C, Fig. 6, multiplied by the number of turns in that ringer winding. In addition, however, this latter curve is inverted with respect to the corresponding curve of Fig. 6 to indicate that the winding connections have been reversed as is necessary to properly phase the currents in the two windings for optimum operating efficiency.

The two curves of Fig. 7 are combined in Fig. 8. The resulting curve represents those total effective ampere turns through the entire ringer coil. The forces acting on the armature of the ringer are directly proportional to the ampere turns present in the ringer. The curve, Fig. 8, therefore, clearly indicates the approximately symmetrical full wave character of the forces generated during a ringing interval. Because of the greatly improved character of the generated driving forces, ringer efficiency is improved, ringing tone is steady and clear, and the restrictions imposed by the pulsating voltage source are eliminated.

Through the ringer circuit of this invention the possibility of using the ringer generally employed as a private line ringer, in four-party selective and eight-party semi-selective services is a reality. The new ringer circuit has also been found to meet all sensitivity requirements of four-party and eight-party services under adverse circuit conditions.

With the introduction of the ringer circuit of this invention, a design objective long sought for has been realized. A single code of ringer is now available for use in all modern type combined telephone sets regardless of the class of service these sets are intended for.

The coil 15 shown in Figs. 3 and 4 represents the well-known ringing current trip relay located at the central office through which the ringing current flows and which functions, upon response of a called subscriber, to trip the flow of ringing current in well-known manner.

Structurally, the ringer of this invention may follow the general design disclosed, for example, in United States Patent 2,590,500, issued March 25, 1952 to H. A. Bredehoft and M. S. Richardson.

What is claimed is:

1. In a telephone ringer, an electromagnet having a core and an armature, means controlled by said armature to provide audible signals, a pair of operating coils on said core, one of said operating coils having less impedance than the other, and a capacitor in series with the coil of lesser impedance connected across said other operating coil.

2. In a telephone ringer, an electromagnet having a core and an armature, means controlled by said armature for providing an audible signal, a pair of operating coils of different impedances carried by said core, a capacitor connected in series with the coil of lesser impedance, and circuit means connecting the serially connected capacitor and coil of lesser impedance in shunt with the coil of greater impedance.

3. In a telephone ringer for use on a multiparty telephone line on which selectivity of ringer operation results from the conversion of alternating current from a ringing current source into unidirectional pulsating currents of different polarities, an electromagnet having a core and armature means to provide an audible indication, a high impedance winding, a low impedance winding, both said windings mounted on said core, a capacitor, and circuit means connecting the low impedance winding in series with the capacitor and the serially connected low impedance winding and capacitor in shunt to the high impedance winding, whereby the unidirectional pulsating current to which the ringer is subjected is converted to a substantially symmetrical full-wave current within the ringer windings.

References Cited in the file of this patent

UNITED STATES PATENTS

| | | |
|---|---|---|
| 984,202 | Erickson | Feb. 14, 1911 |
| 1,102,415 | Kaisling | July 7, 1914 |
| 1,608,551 | Demarest et al. | Nov. 30, 1926 |
| 1,888,427 | Durkee | Nov. 22, 1932 |
| 2,040,763 | Summers | May 12, 1936 |
| 2,117,064 | Ketay | May 10, 1938 |
| 2,774,920 | Kesselring | Dec. 18, 1956 |

FOREIGN PATENTS

| | | |
|---|---|---|
| 18,462 | Australia | Mar. 4, 1930 |
| 368,586 | Italy | Feb. 18, 1939 |
| 448,549 | Great Britain | June 10, 1936 |
| 687,202 | Great Britain | Feb. 11, 1953 |